United States Patent [19]
Bertram et al.

[11] 3,853,419
[45] Dec. 10, 1974

[54] COMPACTOR WHEEL CONFIGURATION

[75] Inventors: August H. Bertram, Aurora; Andrew J. Gorski, Naperville, both of Ill.

[73] Assignee: Caterpillar Tractor Co., Peoria, Ill.

[22] Filed: June 21, 1973

[21] Appl. No.: 372,412

[52] U.S. Cl. .................. 404/121, 301/43, 172/540
[51] Int. Cl. ............................................ E01c 19/26
[58] Field of Search ......... 404/121; 301/43; 180/20; 172/540

[56] References Cited
UNITED STATES PATENTS

| | | | |
|---|---|---|---|
| 1,403,195 | 1/1922 | Rapattoni | 404/121 X |
| 1,406,562 | 2/1922 | Hruby | 404/121 X |
| 1,501,937 | 7/1924 | Benjamin | 404/121 X |
| 1,673,184 | 6/1928 | Cady | 404/121 X |
| 1,858,327 | 5/1932 | Hays | 404/121 X |
| 3,180,442 | 4/1965 | Pomeroy | 404/121 X |
| 3,183,804 | 5/1965 | Le Tourneau | 404/121 |

*Primary Examiner*—Nile C. Byers, Jr.
*Attorney, Agent, or Firm*—Phillips, Moore, Weissenberger Lempio & Strabala

[57] ABSTRACT

A compactor wheel in the form of a cylinder having a plurality of radially extending chopper blades attached thereto in an offset chevron pattern, each blade being reinforced by a generally pyramidal gusset so as to minimize packing through a self-cleaning action as well as provide an increased chopping action.

8 Claims, 3 Drawing Figures

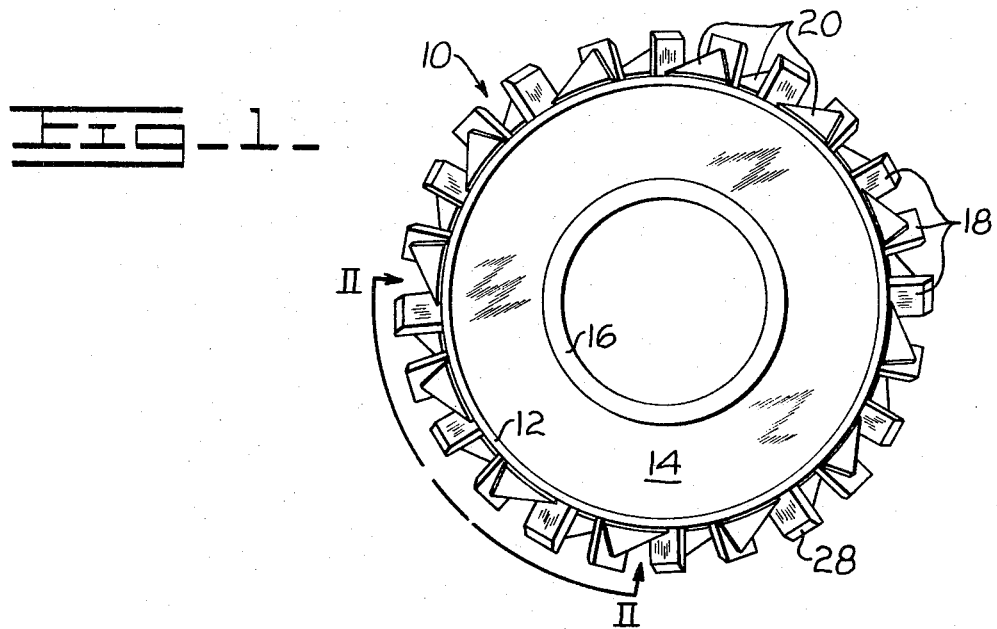
Fig-1-
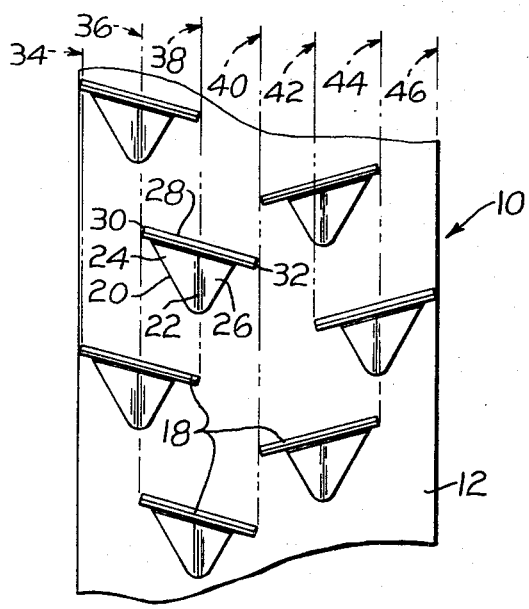
Fig-2-
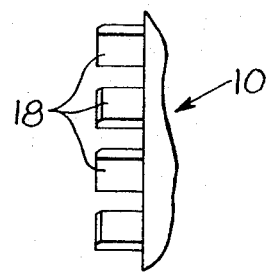
Fig-3-

COMPACTOR WHEEL CONFIGURATION

BACKGROUND AND SUMMARY OF THE INVENTION

This invention relates to a compactor wheel for use on a compactor vehicle. More particularly, this invention relates to a compactor wheel configuration in the form of a cylinder having a plurality of chopper blades attached thereto.

Compactor vehicles are frequently used in the pulpwood industry wherein a method of forest management has been developed that involves harvesting all trees on a given tract and then preparing the land for replanting. The process of preparing for replanting is called "site preparation."

Currently, site preparation consists of towing drum-type choppers with track-type tractors equipped with bulldozers over the site to be prepared. The bulldozers function to both knock down trees and brush as well as to cut them into small pieces by means of the towed, drum-type choppers. The choppers must operate to cut the felled trees into pieces small enough such that they will not interfere with the planting machines that follow. The chopper blades further function to penetrate and loosen the soil and crush tree roots such that the new seedlings are able to get a good start. With the present bulldozer-chopper system, more than one pass is usually necessary to achieve satisfactory site preparation. Thus, the number of acres that may be prepared in a given time period is unduly limited.

Compactor vehicles are also frequently used in sanitary landfill operations wherein pits or low areas are alternately filled in with layers of debris and soil. Each layer must be compacted to a maximum density in order to conserve valuable land space. The problem encountered to date has been to completely cut up, crush and compact the debris to obtain the desired maximum density. Currently used in sanitary landfill operations are sheep's foot rollers which are either towed behind a bulldozer or are on an external part of a self-propelled vehicle. These sheep's foot rollers are not a completely satisfactory solution to the sanitary landfill problem since they have a tendency to clog. While other types of vehicle wheels for compacting in sanitary landfill operations have been suggested, e.g., that shown in U.S. Pat. No. 3,463,063, such designs do not achieve the depth of soil penetration necessary for both the sanitary landfill and forestry site preparation operations.

A design that does achieve the depth of soil penetration necessary is shown in U.S. Pat. No. 3,687,023, assigned to applicants' assignee. However, some clogging between blades and their supporting gussets is possible. This clogging or packing is a major problem in that it reduces efficiency and ultimately requires that the machine be driven away from the fill area and the wheels cleaned. Alternatively, cleaning mechanisms as shown in U.S. Pat. No. 3,259,036 may be used with a consequent and undesired increase in complexity. Another problem is that of wear of the present plate-type gussets, which requires replacement or rebuilding at frequent intervals and thus decreases efficiency and operating time. Yet another problem with the plate-type gussets is that they cover a portion of the blade edge and thus decrease chopping action.

OBJECTS OF THE PRESENT INVENTION

It is therefore an object of the present invention to provide a compactor wheel with a plurality of chopper blades thereon providing an improved chopping and flattening action.

It is a further object of this invention to provide a compactor wheel having an improved blade pattern which minimizes clogging, and provides a relatively smooth ride and maximum compaction.

It is a still further object of this invention to provide a compactor wheel having reinforcing blade gussets which are shaped and located to reduce wear and provide a self-cleaning action so as to minimize clogging.

It is a still further object of this invention to provide a compactor wheel having a maximum blade free edge area so as to provide increased chopping action.

Further and more specific advantages of the present invention and the manner in which it is carried into practice are made apparent in the following specification wherein the invention is described in detail by reference to the accompanying drawing.

BRIEF DESCRIPTION OF THE DRAWING

FIG. 1 is a side elevation view of a compactor wheel illustrating the orientation of the chopper blades mounted around the periphery thereof;

FIG. 2 is a partial peripheral view of the compactor wheel taken in the direction II—II in FIG. 1 and illustrating the orientation of the chopper blades as well as the reinforcing gussets; and FIG. 3 is a side elevation view taken from FIG. 2 with portions omitted for clarity and illustrating successive blade spacing.

DETAILED DESCRIPTION

Referring now to FIG. 1, there is shown generally a side elevation view of a single compactor wheel 10. The compactor wheel defines a hollow metal cylinder or drum 12 having end walls in the form of a pair of web members, one of which is shown at 14 fixed to each end thereof. An attachment ring 16 is further provided around a hole in the web for the purpose of facilitating attachment to a vehicle axle by conventional attachment means (not shown).

Fixedly mounted around the outer periphery of the cylinder are a plurality of identical chopper blades oriented in an offset chevron pattern.

An individual chopper blade comprises essentially a rectangularly shaped metal plate having dimensions of height, length and thickness. The height is substantial with respect to the wheel diameter to ensure depth of penetration. Each chopper blade, for example, chopper blade 18, is fixedly mounted to the outer periphery of the cylinder at an angular orientation to the cylinder axis and in a generally radially outwardly extending direction from said axis. Blade 18 is beveled along its free length edge to produce a sharpened edge 28 for cutting and chopping. The metal blades are secured to the cylinder periphery along a length edge by any convenient means such as welding. In addition, a small pyramidally shaped gusset 20 is similarly secured between the planar blade surface and the wheel periphery for purposes of reinforcement. This gusset may be conveniently made by bending a triangular metal plate to form an edge 22 and a pair of angled faces 24, 26, as seen in FIG. 2. The faces 24, 26 which form an angle to the plane of the adjacent blade produce a self-cleaning action since material which moves radially inwardly during compaction and might otherwise tend to clog or pack between successive blades and their gussets is broken by edge 22 and forced in opposite lateral or axial directions by faces 24, 26. In addition, clogging is minimized and self-cleaning enhanced by orienting the blades in four rows. In the example wheel shown, the blades 18 are arranged in four rows, each row containing six blades equally spaced around the wheel.

Utilizing a centrally placed gusset also provides an additional benefit in the form of increased chopping action over the prior art blades which have gussets located so as to cover a height edge. Thus, height edge 30, 32 of chopper blade 18 are free so as to assist the normal cutting action provided by length edge 28. The sharp corners formed by the intersection of the height edges 30, 32 and the length edge 28 also produce more effective chopping action by providing seven rows 34, 36, 38, 40, 42, 44 and 46 of end corners.

As shown in FIG. 3, the spacing between successive blades is quite small thus providing a relatively smooth ride for the vehicle mounting the wheel.

It is understood that the foregoing description is merely illustrative of a preferred embodiment of the invention and that the scope of the invention is not to be limited thereto, but is to be determined by the scope of the appended claims.

What is claimed is:

1. A compactor wheel comprising a cylinder defining an axis of rotation and a diameter, a plurality of chopper blades successively mounted around the periphery of said cylinder, each of said blades being oriented at an angle to said cylinder axis and extending only part way across said cylinder, each of said chopper blades being in the form of a rectangularly shaped plate member having dimensions of height, length, and thickness, each of said blades defining a pair of parallel planar side surfaces intersecting a radially outermost length edge defining an edge surface perpendicular to said side surface, each of said chopper blades being secured to the cylinder periphery along a radially innermost length edge so that the blade extends radially outwardly from said cylinder, the radially outermost length edge having a beveled surface thereon intersecting with only one of said side surfaces and said edge surface to produce a cutting edge thereon so as to ensure penetration sufficient to chop tree roots, loosen soil, and crush debris, and further including a reinforcing gusset of pyramidal shape and defining four angled planar faces, one of which abuts a respective blade and another of which abuts the wheel periphery so as to fixedly retain said blade with respect to said peripheral surface.

2. The compactor wheel of claim 1 wherein the height of each radially extending chopper blade is substantial with respect to the wheel diameter.

3. The compactor wheel of claim 1 wherein said wheel is of metal material.

4. The compactor wheel of claim 1 wherein successive chopper blades are axially offset with respect to each other.

5. The compactor wheel of claim 1 wherein said chopper blades are oriented in four rows axially along the wheel periphery.

6. The compactor wheel of claim 1 wherein said chopper blades are oriented in an offset chevron pattern.

7. The compactor wheel of claim 1 wherein the height edges of each of said blades is free so as to provide additional chopping action.

8. The compactor wheel of claim 7 wherein the intersection between said height and length edges defines sharp blade end corners for providing more effective chopping action, and wherein said blades are mounted on said cylinder such that seven rows of exposed blade end corners are provided.

* * * * *